United States Patent [19]

Johnsson

[11] Patent Number: 4,706,455
[45] Date of Patent: Nov. 17, 1987

[54] FILTERING DEVICE FOR VEHICLE EXHAUST

[76] Inventor: Rolf Johnsson, Vattentornsgatan 138, S-427 37 Angered, Sweden

[21] Appl. No.: 899,292
[22] PCT Filed: Dec. 18, 1984
[86] PCT No.: PCT/SE84/00433
 § 371 Date: Aug. 14, 1986
 § 102(e) Date: Aug. 14, 1986
[87] PCT Pub. No.: WO86/03802
 PCT Pub. Date: Jul. 3, 1986
[51] Int. Cl.[4] .............................................. F01N 3/02
[52] U.S. Cl. ........................................ 60/311; 55/485; 55/DIG. 30; 60/295; 285/322
[58] Field of Search ................................. 60/295, 311; 55/DIG. 30, 485; 285/322, 323, 324

[56] References Cited

U.S. PATENT DOCUMENTS

| 2,524,588 | 10/1950 | Bechtel | 60/311 |
| 2,620,893 | 12/1952 | Holt | 60/311 |
| 3,406,501 | 10/1968 | Watkins | 60/311 |
| 3,476,412 | 11/1969 | Demler | 285/322 |
| 3,675,398 | 7/1972 | Giarrizzo | 60/311 |
| 4,328,979 | 5/1982 | Stoll | 285/322 |

FOREIGN PATENT DOCUMENTS 765977 9/1971 Belgium .................. 55/485
635654 4/1983 Switzerland .

Primary Examiner—Douglas Hart
Attorney, Agent, or Firm—Cushman, Darby & Cushman

[57] ABSTRACT

A filtering device intended to be attached temporarily to an exhaust pipe (30) of a vehicle at occasional indoors driving and the like. The device comprises a filter (14), a filter holder (11) and a connection member (13,40) for attachment to the exhaust pipe. The object is to provide an exhaust filter which is simple to mount and dismount, which is self-supporting, which can be manufactured so cheap that it can be used as a disposable article, and which gives possibility of choice regarding the connection to different dimensions of exhaust pipes. These objects have been solved by the fact that the filter holder (11) consists of a double-sided open sleeve (15), both ends of which are designed with coupling means (16, 17), for example in the form of a bayonet com22 plings, for connection of a perforated cover (12) attachable at one end of the sleeve and provided with corresponding coupling means, said cover being intended for inclusion of said filter (14) which is locatable against a seat (22) in the sleeve, and that to the other end of the sleeve (15) there are connectible alternative connection members (13, 40) for attachment to exhaust pipe (30) with different diameters, and which connection member is arranged in the axial extension of the sleeve and designed to support the holder (11).

5 Claims, 7 Drawing Figures

FILTERING DEVICE FOR VEHICLE EXHAUST

The present invention relates to a filtering device intended to be attached temporarily to an exhaust pipe of a vehicle at occasional indoor driving and the like and comprising a filter, a filter holder and a connection member for attachment to the exhaust pipe.

At occasional driving of the vehicle with internal combustion engines in factories, garages, work-shops, at loading and unloading on ships or car ferries or the like the discharge of exhaust makes a great unhealthy and sanitary problem. Through the U.S. Pat. No. 3,596,441 it is known to connect a tube-shaped filter to the exhaust pipe of the vehicle, the first object of which is to absorb condensate and soot particles from the exhaust system when the vehicle have stood still for some time. For longer idle driving or even displacing of the vehicle with its own engine this filter is not suitable.

There is also known an exhaust filter in the form of a relatively large box, which is attached to some constructional part of the rear part of the vehicle, for example the bumper and which via a flexible tube can be connected with the end of the exhaust pipe of the vehicle. The box contains a filter which reduces the hydrocarbones, nitrous oxides, sulphur oxides, carboxide and aldehydes and separates soot and lead particles, which are larger than 0.1 $\mu$m. The box is further provided with air guides, connection members in the form of hooks with mechanical locking devices or strong magnets and the flexible tube is provided with a rubber funnel intended to be threaded on the exhaust pipe of the vehicle. The rubber funnel is held in a position by means of rubber loops which are hooked in the vehicle. This exhaust filter box by itself is effective, and can be attached to different dimensions of exhaust pipes, and withstands a multiply of starts and short drivings, but it is expensive and because of its size and weight it is a complication, which requires a relatively circumstantial mounting and dismounting.

THE OBJECT AND MOST IMPORTANT FEATURES OF THE INVENTION

The object of the present invention is to provide an exhuast filter which is simple to mount and dismount, which is self-supporting, i.e. does not require to be fixed to a part of the vehicle except the exhaust pipe, which can be manufactured so cheap that the whole device can be used as a disposable article, which gives possibility of choice regarding the connection to different dimensions of exhaust pipes and which in spite of its low weight and compression performance fulfils the demands on separation of particles and reduction of harmful gases caused by a prescribed number of startings and drivings. These objects have been solved by the fact that the filter holder consists of a double-sided open sleeve, both ends of which are designed with coupling means, for example in form of a bayonet couplings, for connection of a perforated cover attachable at one end of the sleeve and provided with corresponding coupling means, said cover being intended for inclusion of said filter which is locatable against a seat in the sleeve, and that to the other end of the sleeve there are connectible alternative connection members for attachment to exhaust pipes with different diameters, and which connection member is arranged in the axial extension of the sleeve and designed to support the holder.

DESCRIPTION OF THE EMBODIMENTS

Figure 1:
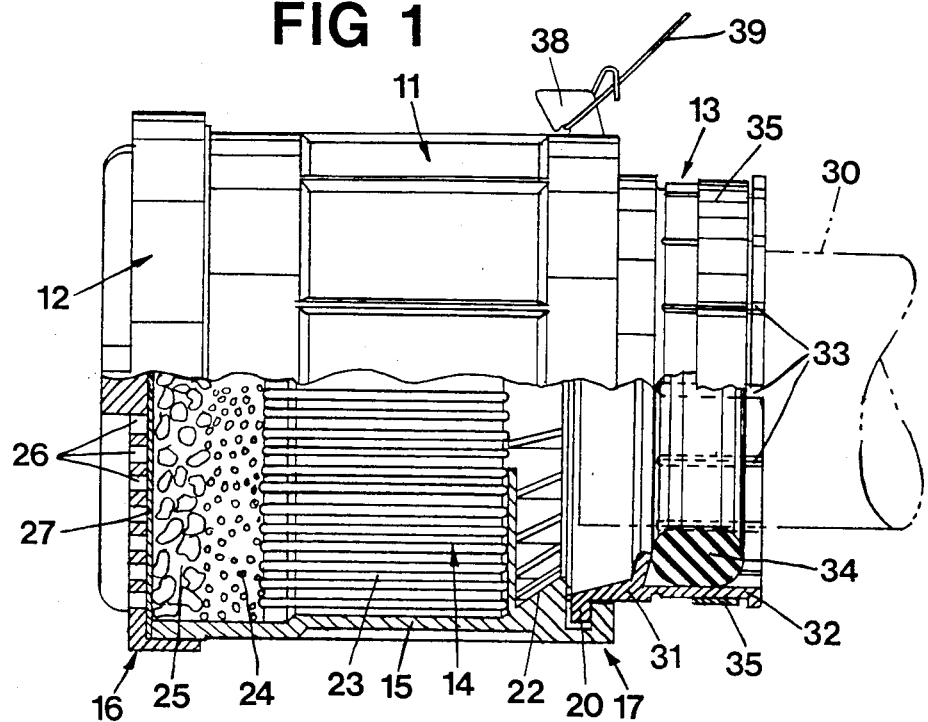
FIG. 1 shows an exhaust filter according to the invention partly in front view and partly in section.
Figure 2:
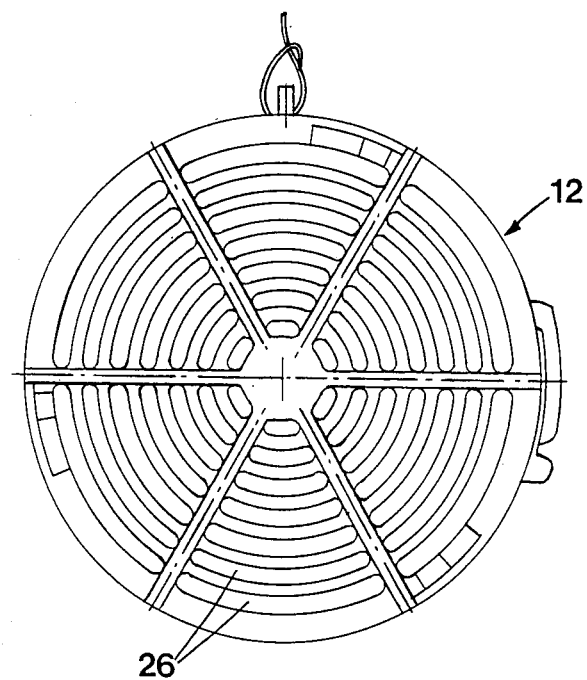
FIG. 2 shows the front end view of the exhaust filter according to FIG. 1.

The exhaust filter according to the invention mainly consists of four parts, a filter holder 11, a cover 12 connectible to its one front end, a connection member 13 connectible to the another rear end of the filter holder, and a filter body 14.

The filter holder is made of a double-sided open sleeve 15, which in both ends is provided with coupling means 16 and 17 for connection of the cover 12 respective the connection member 13. The coupling means 16, 17 preferably consist of bayonet couplings, the male and female parts 18, 19 respective 20,21 of which are arranged peripherically on said parts. The numeral 18 thus denotes lips projecting on the inside of the cover 12, while the numeral 19 denotes on the circumference of the filter holder arranged grooves for receiving said lips 18. On the same way there are arranged grooves 21 at the opposite end of the filter holder, which cooperate with in the corresponding way designed lips 20 at one end of the connection member 13. In the filter holder 11 at the end which is facing the connection member 13 there is arranged a conical seat 22 for the filter body 14. This comprises a first filter portion 23 of folded micro fiberglass, a second filter portion 24 consisting of soda lime and a third filter portion 25 of active carbon. As the both last mentioned filter portions are in powder or particle form and the cover 12 is formed with perforations 26 there is in front of these arranged a filter sheeting 27 covering the perforation.

In order to prevent an involuntary opening of the cover 12 of the exhaust filter there are arranged ramp-shaped cavities 28 on the end surface of the filter holding 11 facing the cover 12, which cavities cooperate with ramp-shaped lips 29 arranged on the inside of the cover just opposite the cavities and arranged in such a way that they in the position when the cover is coupled together with the sleeve engages each other and in this way obstruct an opening of the connected parts.

Figure 3:
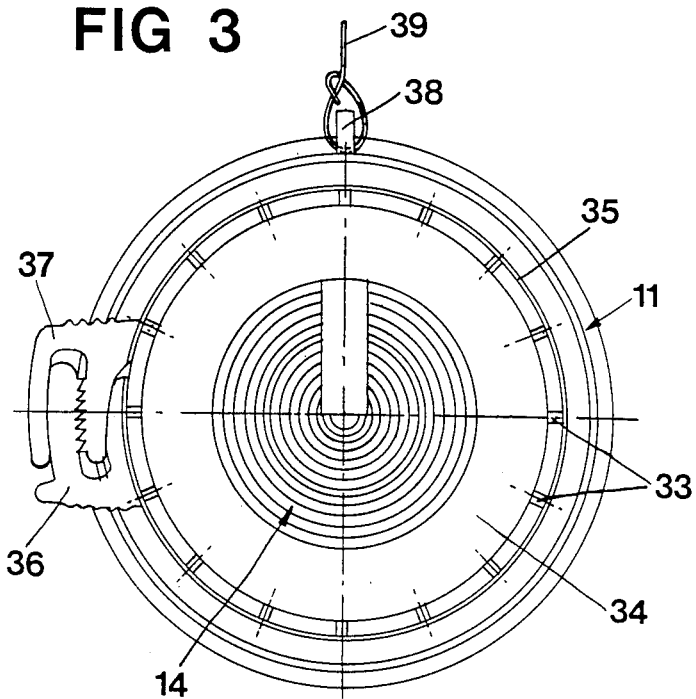
FIG. 3 shows the rear end view of the exhaust pipe according to FIG. 1.
Figure 4:
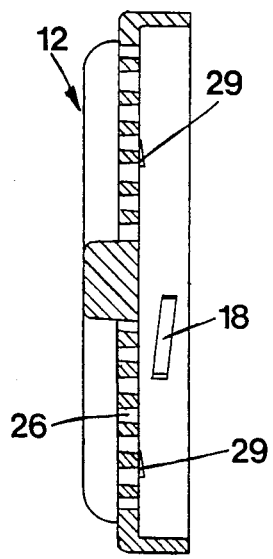
FIG. 4 shows a section through the cover of the exhaust filter.
Figure 5:
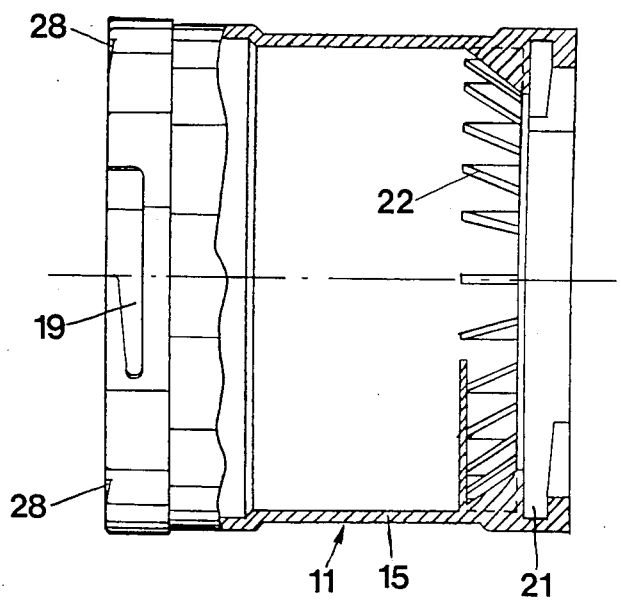
FIG. 5 shows the filter holder of the exhaust filter in side view and partly in section.

Considering that motor vehicles are manufactured in a number of different variants with respect to the discharge end of the exhaust pipe, the connection member 13 is replaceable to such alternatives, which permit an effective attachment of the exhaust filter to a specific or several different sizes of exhaust pipes 30. In car factories where only a small number of exhaust pipes with different diameters exist, but on the other hand in very large numbers it is adequate to make the connection member 13 fitting to a special diamension of exhaust pipes. Such an embodiment is shown in FIGS. 1 and 3, where the connection member consists of a connection part 31 comprising the above mentioned bayonet coupling part 20 and a clamp part 32, which is provided with axially arranged slits 33 so that the clamp part by means of a hose clamp 35 or the like can be rigidly clamped to the exhaust pipe 30 via an O-ring 34. The hose clamp 35 is of quick coupling type, as shown in FIG. 3, and with a simple hand grip in a known manner can be connected by tightening the two grip portions 36 and 37 at both end portions of the band-shaped hose clamp 35.

The mounting of a so constructed exhaust filter might be done in the most simple possible way, by the fact that the mounted exhaust filter with a fitted connection member 13 is threaded over the exhaust filter 30, whereupon the loosely applied hose clamp 35 is tightened, i.e. is compressed manually and the mounting is finished. In order to prevent that the exhaust filter is dropped, for example by being clung to some object, a tie or hook 38 for a thread or a string 39 is arranged on the filter holder 11 which thread or string can be tied in some projecting part of the vehicle, for example the operating rod.

Figure 6:
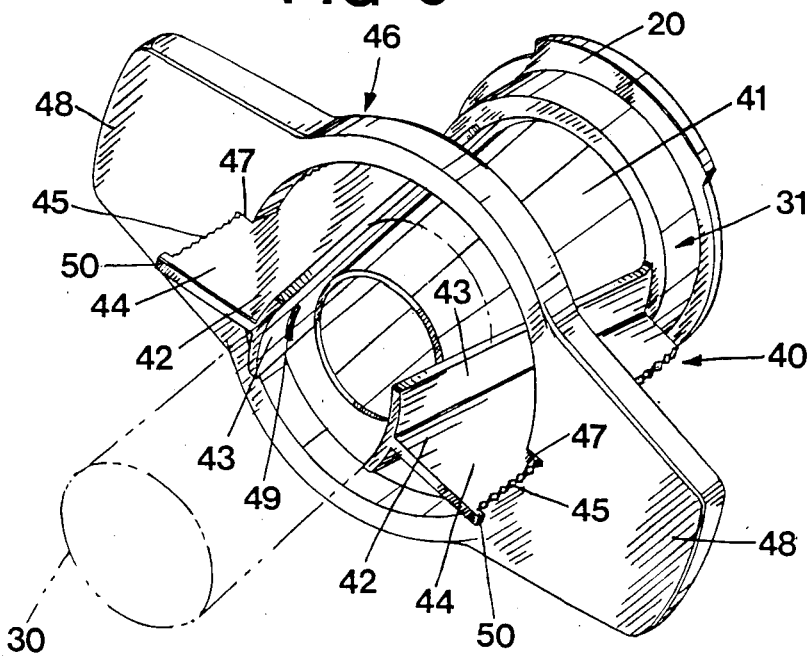
FIGS. 6 and 7 illustrate a perspective view of an alternative connection member from the front and back.
Figure 7:
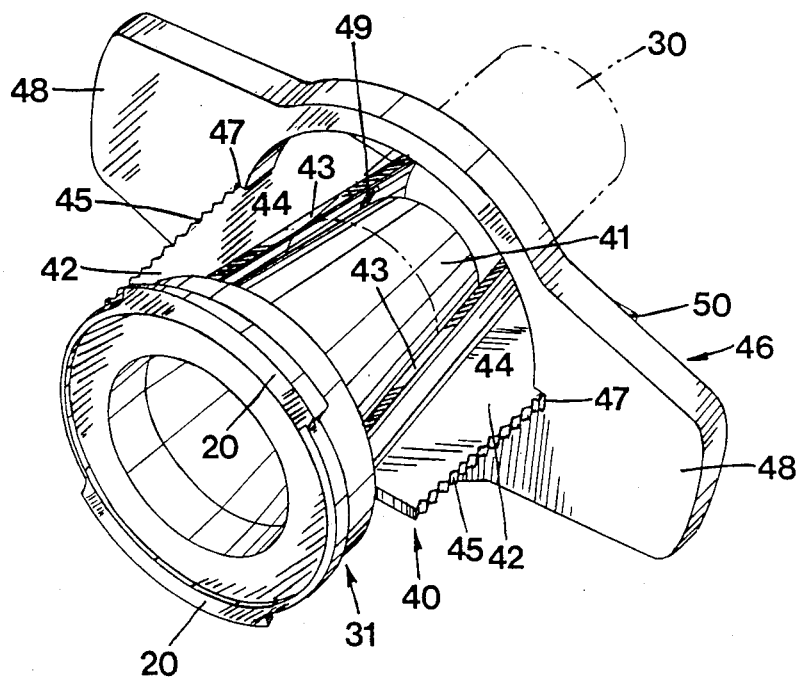

In order to be able to use the exhaust filter in workshops, garages and the like, where there are many different diameters of exhaust pipes, a connection member 40, of the kind which is shown in FIGS. 6 and 7 is preferably used. This consists in the same way as the connection member 13 of an attachment portion 31 also provided with bayonet coupling means 20. From the attachment portion 31 an inner sleeve-shaped taper 41 extends axially. Outside this there is arranged two T-shaped clamp loops 42 in cross section, which on its one end is rigidly connected with the attachment portion 31 or with the taper. The cross staple 43 of the T-shaped clamp loops 42 can be brought in close contact with the sleeve-shaped taper 41, and for obtaining an effective holding the surface of the cross staple 43 facing the exhaust pipe 30 is provided with friction increasing means for example steel reinforcement 49 provided with sharp edges. The web 44 of the clamp loops is at the free end provided with a cogging 45, which cooperates with a locking ring 46 intended to be threaded over the attachment member and which for the cooperation with the cogging 45 is designed with diametrically opposed grooves 46, the groove bottom of which have a corresponding cogging for cooperation with the cogging 45. At the free end of the clamp loops 42 in connection with the cogging 45 there is arranged a stop lug 50, which prevents the locking ring to be drawn off from the clamp loops, when the connection member 40 has been applied on an exhaust pipe 30. The attachment portion 31 of the connection member 40, the taper 41 and the clamp loops 42 are preferably manufactured in one piece of a plastic material, with the clamp loops 42 directed outwards, so that these exert a resilient pressing force against the locking ring 46, which by that is held effectively.

The connection member 40, which replaces the connection member 13 in FIG. 1, is connected with the filter by the fact that its bayonet coupling portions are screwed together. Then the cone-shaped sleeve 41 is passed on the exhaust pipe 30, at which the locking ring 46 is located in its upper position closest the attachment portion 31 until the taper has obtained a good attachment on the exhaust pipe 30. Then the locking ring 46 is passed in the direction towards the exhaust pipe, at which through the tapering shape of the web portions 44 a strong tightening of the clamp loops 42 against the exhaust pipe 30 is obtained. The locking ring 46 is provided with strong projecting wings 48 which facilitates the pressing of the clamp loops on the exhaust pipe.

At the dismounting of the exhaust filter the locking ring 46 is drawn in the direction against the filter holder, whereby the grip of the clamp loops about the exhaust pipe is ceased and the exhaust filter can be removed.

What is claimed:

1. A filtering device which can be attached temporarily to an exhaust pipe of a vehicle during occasional indoor driving and the like, comprising:
 a filter, and a filter holder including a double-sided open sleeve both ends of which have coupling means in the form of bayonet couplings for connection to a perforated cover attachable at one end of the sleeve, said cover covering said filter, said filter being locatable against a seat in the sleeve, and at the other end of the sleeve there is provided means for connecting the filtering device to an exhaust pipe, said connection means being adaptable to exhaust pipes of different diameters.

2. A device according to claim 1 wherein said connection means comprises an attachment portion having a coupling member for connection to the filter holder.

3. A device according to claim 1 wherein said connection means comprises: a clamp device which includes a frustrum cone arranged to fit over exhaust pipes of different diameters; at least two clamp loops with opposite conicity pivotally connected to, at least one of, the cone and said said attachment portion; and, a locking ring engageable over said clamp loops for pressing the clamp loops against the exhaust pipe.

4. A device according to claim 1 wherein the filter as seen in the flow direction of the exhaust includes a first filter portion such as micro fiberglass fitting over the entire cross-section of the sleeve, a second filter portion of active carbon and a third filter portion of soda lime, and filter sheeting adjacent to the perforations on the cover.

5. A device according to claim 1 wherein said clamp device is made of an axially partially slotted socket, which by means of a hose clamp and a sealing ring is rigidly clampable about the exhaust pipe.

* * * * *

UNITED STATES PATENT AND TRADEMARK OFFICE
CERTIFICATE OF CORRECTION

PATENT NO. : 4,706,455
DATED : November 17, 1987
INVENTOR(S) : Johnsson, Rolf

It is certified that error appears in the above-identified patent and that said Letters Patent is hereby corrected as shown below:

IN THE SPECIFICATION:

Column 4, line 3, after "passed", "on" should read

--into--

IN THE CLAIMS:

Claim 3, line 3, change "over" to --into--

Signed and Sealed this

Third Day of October, 1989

Attest:

DONALD J. QUIGG

Attesting Officer

Commissioner of Patents and Trademarks